(No Model.)

J. T. PINCKNEY.
COMBINED ORDER INDICATOR AND THROTTLE LOCK.

No. 435,634. Patented Sept. 2, 1890.

WITNESSES:
John H. Fravel
B. M. Ssaminger

INVENTOR
John T. Pinckney
BY W. J. Geer
ATTORNEY.

UNITED STATES PATENT OFFICE.

JOHN T. PINCKNEY, OF GALION, OHIO.

COMBINED ORDER-INDICATOR AND THROTTLE-LOCK.

SPECIFICATION forming part of Letters Patent No. 435,634, dated September 2, 1890.

Application filed February 15, 1890. Serial No. 340,637. (No model.)

*To all whom it may concern:*

Be it known that I, JOHN T. PINCKNEY, a citizen of the United States, residing at Galion, in the county of Crawford and State of Ohio, have invented a certain new and useful Improvement in Combined Order-Indicators and Throttle-Locks, of which the following is a specification.

My invention relates to attachments for locomotive-throttles; and the object of my invention is to combine with the throttle-lever an indicating mechanism of simple and inexpensive construction, which will assist the engineer in keeping in mind the fact of his having or not having orders. This object I accomplish in the manner illustrated in the accompanying drawings, in which—

Figure 1:
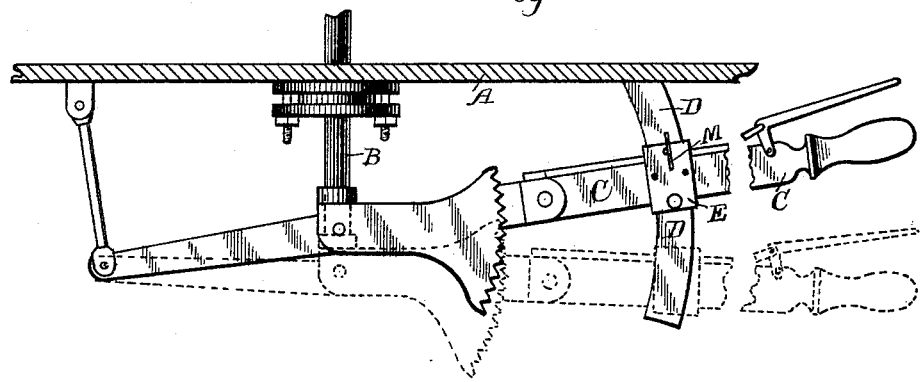
Figure 2:
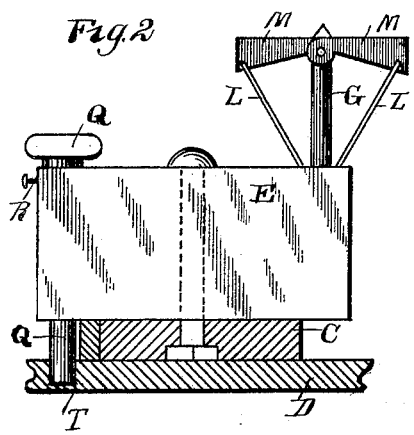
Figure 3:
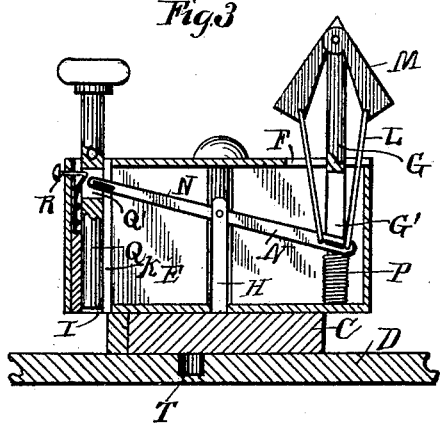
Figure 4:
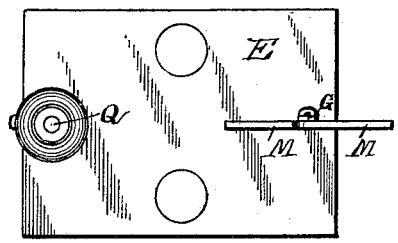
Figure 5:
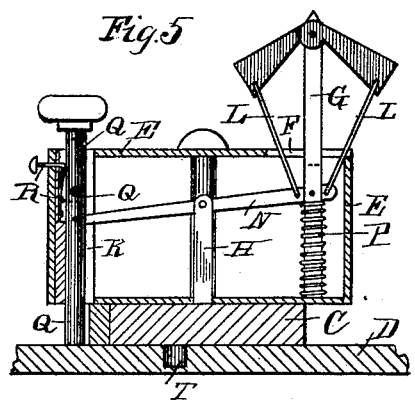

Figure 1 is a plan view of an ordinary locomotive throttle-lever, showing my indicating device connected therewith. Fig. 2 is a sectional view of the throttle-lever and its guide or guard arm, showing the position of the semaphore-indicating attachment when the throttle is closed. Fig. 3 is a central vertical longitudinal section through the indicating-box, showing the position of the semaphore when the engineer has no orders. Fig. 4 is a plan view of said box. Fig. 5 is a central vertical longitudinal section showing the position of the semaphore when the engineer has orders.

Similar letters refer to similar parts throughout the several views.

A represents the boiler-head; B, the throttle-rod; C, the throttle-lever; D, the throttle guide or guard arm, all of which may be arranged and constructed in the ordinary manner, as shown.

E represents an indicator-box, which is secured transversely to the lever C at a point above the guard-arm D.

Rigidly secured to the box-bottom in close proximity to its rear end and at the center of its width is a semaphore-post G, which extends upwardly through said box-bottom, and passing through a slot F, formed in the upper side of the box, terminates at a point above said box.

Projecting upwardly from the center of the box-bottom to a point in its upper half is a post H, extending vertically through the forward end of the box, and opening at the top and bottom thereof is a tube I, which communicates with the interior of the box on its rear side by a vertical slot K.

N represents an arm or lever, which is pivoted at the center of its length to the upper portion of the post H, and which has its rear end projecting through a mortise G', formed in the semaphore-post G.

M represents a semaphore, which, as shown, is of the usual form, and consists in two flat arms, the inner ends of which are pivotally connected at a common point with the upper and outer end of the semaphore-post. These semaphore-arms are each connected with the rear end of the lever-arm N by a rod L, which is pivotally connected with both the semaphore-arm and lever-arm N, the connection with the latter being made on opposite sides of the post G. Surrounding the post G and bearing between the rear end of the arm N and the box-bottom is a coiled spring P.

Q represents a vertical pin, which is inserted within the tube I, and which has near the center of its length a mortise Q', into which projects, through the slot K, the forward and slotted end of the arm N. This forward slotted end of the arm N is pivoted within said pin-mortise by a pivot-pin which passes through the slot of the arm N and is fixed in the walls of the arm Q.

Secured to the inner wall of the tube I is the lower end of a spring-strip R, which has its upper portion bent inwardly near the upper end of the box E.

Formed in the guard-arm D at the desired point is a pin-socket T.

The operation and utility of my invention are as follows: The engine being in motion and the engineer having orders relating to an intermediate station, the lower end of the pin Q is, as shown in Fig. 5 of the drawings, bearing upon the guard-arm D at such point in front of the socket T as may be desired by the engineer. The pin being in this position, the rear end of the pivoted arm N will be at such height as to hold the outer ends of the semaphore-arms down at an acute angle with a horizontal position, as shown in Fig. 5. This position of the semaphore-arms is a constant reminder to the engineer and his fireman that they have orders with respect to some intermediate point on the road. The engineer, having then left his engine to take orders, finds on his return that the semaphore-arms are supported in a horizontal position.

For the sake of further illustration we will suppose that the semaphore is in the position shown in Fig. 5 of the drawings, and that the engineer has orders to stop at a certain station, where he expects to receive other orders. On reaching this station the engine is stopped by drawing the lever back and the pin Q allowed to drop, through tension of the spring P, into the socket T. This dropping of the pin Q will, through the connection therewith of the arm N and the connection of the latter with the semaphore-arms, operate to lift said semaphore-arms to a horizontal position, as shown in Fig. 2 of the drawings. When the semaphore is in this position, it indicates to the engineer that he has orders or is about to receive orders. Having thus stopped the engine, the engineer performs such duties as are required of him at that station, and, we will suppose, receives further orders from the agent at that point. On returning to his engine, he is reminded by the horizontal position of the semaphore of his orders. He then opens the throttle, causing the semaphore to assume the position shown in Fig. 5 of the drawings. In case no orders are received and he is told by the station agent or operator that his way is clear to his next regular stopping-point, the engineer pulls upward upon the pin Q until the spring R engages with and supports said pin by entering the mortise Q' or other indentation in said pin, as shown in Fig. 3 of the drawings. In this manner the pin Q is supported in the elevated position, as shown in Fig. 5 of the drawings, and the semaphore-arms are drawn down to an approximately-closed position, as shown in said figure. The semaphore being in this last-described position, the engineer is reminded thereby that he has no orders. Upon again receiving orders, the spring may be disengaged from the end Q by pulling upward upon said spring and allowing the pin to drop upon the lever-guard and the semaphore to assume the position shown in Fig. 5.

By the operation herein described it will be seen that the engineer will be constantly reminded of the fact that he has or has not orders, and that the danger of running by a point where he has orders to stop will be greatly lessened, and thus the many accidents which have been charged to this mistake will be averted.

In practice the semaphores are preferably painted a bright color, which will aid in attracting the attention of the engineer.

From the construction herein shown and described, it is obvious that my improvement may be produced at a reasonable cost of manufacture; that the simplicity of construction will obviate the tendency of the parts to get out of order, and that, the inclosing-box, being nickel-plated or otherwise ornamented, the device will present a neat appearance. It will also be observed that when the pin Q is situated within the socket T the throttle-lever is locked from movement and cannot be operated until said pin is elevated.

Having now fully described my invention, what I claim, and desire to secure by Letters Patent, is—

1. In a combined order-indicator and throttle-lock, the combination, with the lever C and guard-arm D, of an indicator-box supported upon said lever, a semaphore-post projecting therefrom and having semaphore-arms, as described, a vertically-movable pin bearing within said box, and a pivotally-supported arm connecting, as described, said pin and semaphore-arms, substantially as and for the purpose specified.

2. In a combination order-indicator and throttle-lock, the combination, with the lever C and guard-arm D, the latter having socket T, of an indicator-box E and semaphore-post G, supported within and projecting without said box, semaphore-arms pivotally connected with said post, a pin Q, movably supported in a tubular way formed through said box, an arm N, centrally pivoted to post H, its forward end pivotally connected with a pin Q and its rear end connected, as described, with the ends of the semaphore-arms, a coiled spring surrounding post G beneath arm N, and a spring-strip R, normally projecting within the tubular way I, substantially as described.

JOHN T. PINCKNEY.

In presence of—
W. J. GEER,
E. D. WILLIAMS.